UNITED STATES PATENT OFFICE 2,357,985

SYNTHESIS OF HEXOESTROL

Everett S. Wallis, Princeton, and Seymour Bernstein, Newark, N. J., assignors to Research Corporation, New York, N. Y., a corporation of New York No Drawing. Application July 30, 1940,
Serial No. 348,596

8 Claims. (Cl. 260—619)

An object of the present invention is to provide an economical process for the production of hexoestrol. More specifically an object of the invention is to provide a relatively simple process which employs a relatively inexpensive starting material and gives a good yield of the product.

The invention contemplates the use of p-oxypropiophenone, which is relatively inexpensive, as the starting material but may start with the alkoxy derivative thereof, e. g. p-methoxypropiophenone or with the corresponding alkyl p-(α hydroxy propyl)-phenyl ether, e. g. methyl p(α hydroxy propyl)-phenyl ether both of which are known in the art although not at present readily available. The complete method of making the hexoestrol from p-oxypropiophenone as the starting material includes the following steps. (1) Conversion of the p-oxypropiophenone by alkylation, e. g. by methylation with dimethyl sulfate, into the corresponding alkyl ether, e. g. p-methoxypropiophenone. The yield is about 88%. (2) Reduction of the alkyl ether (p-alkoxypropiophenone), specifically p-methoxypropiophenone, to the corresponding alkyl p-(α hydroxy propyl)-phenyl ether, specifically methyl p-(α hydroxyl propyl)-phenyl ether by means of, e. g. sodium and alcohol. The yield in this step is about 60%. (3) Conversion of the product of step 2 into the corresponding halogeno compound, e. g. conversion of the methyl p-(α hydroxy propyl)-phenyl ether into methyl p-(α bromo propyl)-phenyl ether, by the action of, e. g. dry hydrogen bromide at 0° C. (4) Condensation of the halogeno compound of step 3 into the corresponding dialkylether, specifically condensation of the methyl p-(α bromo propyl)-phenyl ether to the dimethylether of hexoestrol, e. g. by allowing an ether solution of the bromo compound (dried with anhydrous sodium sulfate and calcium chloride) to stand in contact with sodium wire at room temperature. The yield of the dimethylether of hexoestrol by reactions 3 and 4, based on the weight of the methyl p-(α hydroxy propyl)-phenyl ether, is about 15%. (5) Saponification or dealkylation of the dialkylether of hexoestrol to hexoestrol, specifically saponification or demethylation of the dimethylether of hexoestrol to hexoestrol, e. g. by treatment with hydriodic acid. The product has a melting point of 184-5° C. The yield of this step is about 87%. The yield of hexoestrol based on the p-oxypropiophenone is about 7%.

The process outlined above may be represented by the following reaction equations:

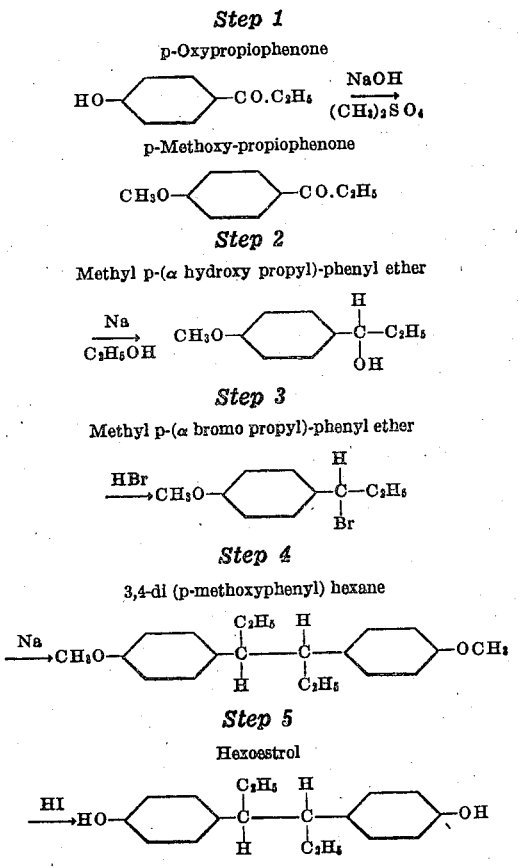

It will be appreciated that in the foregoing reaction scheme, Step 1 may be carried out with any suitable methylating or alkylating agent and that the product of Step 1 therefore may be any p-alkylpropiophenone represented by the formula

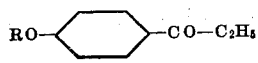

in which R is an alkyl group. Step 2 may be carried out with any suitable reducing agent and applied to any p-alkylpropiophenone resulting from reaction 1, yielding the corresponding alkyl p-(α hydroxy propyl)-phenyl ether which may be represented by the general formula

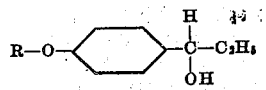

in which R is an alkyl group. Step 3 may be applied to any alkyl p-(α hydroxy propyl)-phenyl ether of Step 2 and may employ any suitable halogenating agent such as HX, PX₃, PX₅, POX₃ or SOX₂ in which X stands for halogen, yielding halogeno compounds which may be represented by the general formula

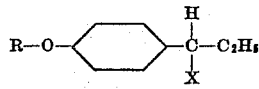

in which R is an alkyl group and X is a halogen. Step 4 may be applied to any of the products of Step 3 using any suitable condensing agent such as the alkali metals, the alkaline earth metals and other metals such as Cu, Ag, Mg and Zn, yielding compounds of the general formula

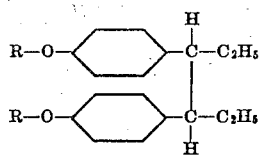

in which R stands for alkyl. Step 5 may be applied to any of the products of Step 4 and may use any suitable saponifying agent such as water, mineral acids, alkaline solutions, alkali metals, aluminum chloride and organometallic compounds such as Grignard reagents.

A preferred procedure in accordance with the invention is as follows.

A mixture of 57 grams of p-oxypropiophenone and 30 grams of dimethyl sulfate is heated to 80° C. A solution of sodium hydroxide is then added until the reaction mixture becomes alkaline. Maintaining the same temperature, more dimethyl sulfate is added, and in turn more sodium hydroxide until the mixture is again alkaline. This procedure is repeated several times until a total of 92 grams of dimethyl sulfate are used. The alkaline reaction mixture is then refluxed for two hours, and allowed to cool to room temperature. The reaction mixture, now acid, is made alkaline and taken up in ether. The ether extract is washed with water until neutral, dried with anhydrous sodium sulfate and evaporated. The yellow liquid residue is distilled under diminished pressure.

The yield of p-methoxypropiophenone (1'-oxo-4-methoxy-1-propyl benzene) is 56 grams or 88% of the theoretical yield. Its boiling point is 151–152° C. at 19 mm. pressure.

76 grams of the p-methoxypropiophenone are dissolved in 500 cc. of absolute ethyl alcohol. The solution is heated to the reflux point, when 75 grams of sodium, cut in small pieces, are added all at once through the top of the condenser (150 cm. long, 3.3 cm. internal diameter). A vigorous reaction results but subsides rapidly. The reaction mixture is allowed to cool and stand over night. 400 cc. of water are then added and complete solution results with the formation of two immiscible layers. The upper layer is yellow and the lower water-white. The ethyl alcohol is removed by distillation and the heterogeneous liquid residue taken up in ether. The ether extract is washed with water until neutral, dried with anhydrous sodium sulfate, and evaporated. The residue is a yellow oil (wt. 76 grams) which is fractionally distilled under diminished pressure in an atmosphere of nitrogen.

The fraction which distills at 137–140° C. at 11.5 mm. pressure ($n_D^{20}$=1.5245) amounts to 46 grams or 60% of the theoretical yield of methyl p-(α hydroxy propyl)-phenyl ether (1'-oxy-4-methoxy-1-propyl benzene) from the 76 grams of p-methoxypropiophenone used.

Dry hydrogen bromide is passed for four hours into 15 grams of methyl p-(α hydroxy propyl)-phenyl ether kept at 0° C. by an ice-bath. The reaction mixture, at first, becomes turbid and then gradually assumes a light red color. At this stage the reaction mixture is heterogeneous, consisting of two liquid layers. Ice-cold absolute ether is added, and the resulting ether solution poured into ice-water contained in a separatory funnel. On shaking both layers became water-white. The water layer is extracted twice more with small amounts of cold absolute ether. The combined ether extracts are dried with sodium sulfate and then with anhydrous calcium chloride for 10 minutes, and used immediately in the following reaction.

This product is the methyl p-(α bromo propyl)-phenyl ether (1'-bromo-4-methoxy-1-propyl benzene). In the foregoing procedure it is necessary to work up the product as rapidly as possible and to use ice cold solvents because the bromo compound is not stable.

The ether solution of the bromo compound of the above step (200 cc.) is added to 15 grams of sodium wire. A slight evolution of gas results, which, however, subsides quickly. The reaction mixture is allowed to stand for 45 hours. Within 4.5 hours of the start of the reaction an appreciable amount of blue solid is formed. Throughout the course of the reaction the surface of the sodium wire is kept "fresh" by frequent stirring. After the reaction has gone 21 hours a small amount of fresh sodium wire is added. At the end of the reaction time a considerable amount of blue solid is formed.

The ether solution is decanted. The residual sodium is destroyed with alcohol and then water is added. The resulting solution is extracted with ether, which is then added to the main ether fraction. The combined ether extracts are washed until neutral, and dried with anhydrous sodium sulfate. The ether solution has a yellow color.

Evaporation of the ether leaves a sweet smelling yellow-brown oil (wt. 13 grams) which partially solidifies on cooling. It is steam distilled to remove volatile impurities (anethole, etc.). It is then taken up in ether. The ether extract has a yellow color which persists after treatment with animal charcoal. The ether solution is dried with anhydrous sodium sulfate and evaporated. The residue (wt. 10 grams) is a yellow-brown oil which crystallizes partially on cooling. After cooling in the ice box it is filtered, and the crystals so obtained are washed with cold methyl alcohol. Wt. 2.6 grams, M. P. 124° C. unsharply. (Evaporation of the methyl alcohol from the mother liquor leaves 7.5 grams of a halogen-free yellow-brown, fairly viscous oil. The nature of this material is being investigated.) The crystals described above are dissolved in acetone and methyl alcohol and the solution concentrated until crystallization takes place. After two such recrystallizations 1.9 grams of brittle plates are obtained. M. P. 142–143.5° C. (uncorr.). From the mother liquors 0.1 gram more of the same material is obtained.

The yield, 2.0 grams, is 15% of the theoretical yield based upon the methyl p-(α hydroxy propyl)-phenyl ether used.

This product is dimethyl hexoestrol (3,4-di [p-methoxyphenyl] hexane). A mixture of 500 mg. of the dimethyl hexoestrol, 2 cc. of glacial acetic acid, and 10 cc. of HI (sp. gr. 1.7) is heated at 135-140° C. for 2 hours. Water is then added and the product worked up in ether. The ether extract has a yellow color which may be removed with SO₂ water. The extract is dried with anhydrous sodium sulfate, and evaporated, leaving 0.4 g. of the product, M. P. 178-180° C. Recrystallization from benzene gives needles, M. P. 184-185° C.

The yield of 0.39 gram of hexoestrol (3,4-di [p-oxyphenyl] hexane) is 87% of the theoretical yield thereof calculated on the 0.5 gram of dimethyl hexoestral used.

The yield of hexoestrol based upon the p-oxypropiophenone is, as stated above, about 7%.

As has been indicated above steps 1 and 2 are not new in themselves but step 3 and the product thereof, i. e. the alkyl p-(α halogeno propyl)-phenyl ether, specifically the methyl p-(α bromo propyl)-phenyl ether, and its production from the corresponding alkyl p-(α hydroxy propyl)-phenyl ether by halogenation, specifically by treatment with HBr, are not only new in themselves but also novel in the sequence of steps outlined, i. e. step 3 is novel in combination with step 2 and with steps 1 and 2 and with step 4 and steps 4 and 5 and with steps 2 and 4 and with steps 1, 2 and 4 and with steps 2, 4 and 5 and with steps 1, 2, 4 and 5.

We claim:

1. Process for the preparation of hexoestrol which comprises methylating p-oxypropiophenone to p-methoxypropiophenone, reducing the p-methoxypropiophenone to the corresponding methyl p-(α hydroxy propyl)-phenyl ether, converting the methyl p-(α hydroxy propyl)-phenyl ether into the corresponding methyl p-(α bromo propyl)-phenyl ether, condensing the bromo compound to dimethyl hexoestrol and demethylating the latter to the production of hexoestrol.

2. Process for the preparation of hexoestrol which comprises alkylating p-oxypropiophenone to p-alkoxypropiophenone, reducing the p-alkoxypropiophenone to the corresponding alkyl p-(α hydroxy propyl)-phenyl ether, converting the alkyl p-(α hydroxy propyl)-phenyl ether into the corresponding alkyl p-(α halogeno propyl)-phenyl ether, condensing the halogeno compound to the dialkyl hexoestrol and dealkylating the latter to the production of hexoestrol.

3. Process which comprises reducing a p-alkoxy propiophenone to the corresponding alkyl p-(α hydroxy propyl)-phenyl ether and converting the latter by halogenation into the corresponding alkyl p-(α halogeno propyl)-phenyl ether.

4. Process which comprises alkylating p-oxypropiophenone to p-alkoxy propiophenone, reducing the latter to the corresponding alkyl p-(α hydroxy propyl)-phenyl ether and converting the latter by halogenation to the corresponding alkyl p-(α halogeno propyl)-phenyl ether.

5. Process which comprises alkylating p-oxypropiophenone to p-alkoxy propiophenone, reducing the latter to the corresponding alkyl p-(α hydroxy propyl)-phenyl ether, converting the latter by halogenation into the corresponding alkyl p-(α halogeno propyl)-phenyl ether and condensing the latter to the corresponding dialkyl hexoestrol.

6. Process which comprises reducing a p-alkoxy propiophenone to the corresponding alkyl p-(α hydroxy propyl)-phenyl ether, converting the latter by halogenation into the corresponding alkyl p-(α halogeno propyl)-phenyl ether and condensing the latter to the corresponding dialkyl hexoestrol.

7. Process which comprises reducing a p-alkoxy propiophenone to the corresponding alkyl p-(α hydroxy propyl)-phenyl ether, converting the latter by halogenation into the corresponding alkyl p-(αhalogeno propyl)-phenyl ether condensing the latter to the corresponding dialkyl hexoestrol and dealkylating the latter to hexoestrol.

8. The method of preparing 3,4-bis-(p-anisyl)-hexane which comprises treating p-(α-bromopropyl)-anisole with metallic sodium.

EVERETT S. WALLIS.
SEYMOUR BERNSTEIN.